(12) United States Patent
Jung et al.

(10) Patent No.: US 10,444,448 B2
(45) Date of Patent: Oct. 15, 2019

(54) OPTICAL MODULE PLATFORM STRUCTURE AND METHOD OF MANUFACTURING THE SAME

(71) Applicant: ELECTRONICS AND TELECOMMUNICATIONS RESEARCH INSTITUTE, Daejeon (KR)

(72) Inventors: Soo Yong Jung, Gwangju (KR); Jong Jin Lee, Gwangju (KR); Eun Kyu Kang, Gwangju (KR); Won Bae Kwon, Gwangju (KR); Jeong Eun Kim, Gwangju (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/042,969

(22) Filed: Jul. 23, 2018

(65) Prior Publication Data
US 2019/0041590 A1     Feb. 7, 2019

(30) Foreign Application Priority Data

Aug. 4, 2017 (KR) .................. 10-2017-0098758
Feb. 1, 2018 (KR) .................. 10-2018-0012813

(51) Int. Cl.
*G02B 6/42* (2006.01)

(52) U.S. Cl.
CPC ............ *G02B 6/4244* (2013.01); *G02B 6/42* (2013.01); *G02B 6/424* (2013.01); *G02B 6/4239* (2013.01); *G02B 6/4245* (2013.01); *G02B 6/4204* (2013.01)

(58) Field of Classification Search
CPC .... G02B 6/4244; G02B 6/424; G02B 6/4239; G02B 6/4204; G02B 6/4245
See application file for complete search history.

(56) References Cited

U.S. PATENT DOCUMENTS

| 4,237,474 A | 12/1980 | Ladany |
| 5,074,682 A * | 12/1991 | Uno ................ G02B 6/327 385/33 |
| 5,260,587 A * | 11/1993 | Sato ................ G02B 6/4249 257/82 |
| 6,707,161 B2 | 3/2004 | Moon et al. |

(Continued)

FOREIGN PATENT DOCUMENTS

| JP | 09-322075 A | 12/1997 |
| KR | 10-2004-0062328 A | 7/2004 |

*Primary Examiner* — Andrew Jordan (57) ABSTRACT

Provided are an optical module platform structure and a method of manufacturing the same. The optical module platform structure includes an optical module platform substrate, a light source device mounted on a light source mount attached on one upper side of the optical module platform substrate, a waveguide spaced apart from the light source device by a certain interval and mounted on a waveguide mount attached on the optical module platform substrate, a lens mount fixed between the light source mount and the waveguide mount, and a lens fixed to a top of the lens mount. Therefore, optical coupling efficiency between a light source and a waveguide is maximized by applying a lens mount, and an optical alignment error is minimized.

20 Claims, 9 Drawing Sheets

(56) References Cited

U.S. PATENT DOCUMENTS

| | | | | |
|---|---|---|---|---|
| 6,901,221 B1* | 5/2005 | Jiang | .................. | G02B 6/4214 |
| | | | | 385/14 |
| 8,086,082 B2 | 12/2011 | Lenderink et al. | | |
| 9,020,308 B2 | 4/2015 | Lim et al. | | |
| 9,829,660 B2* | 11/2017 | Lee | ..................... | G02B 6/4204 |
| 2002/0118924 A1* | 8/2002 | Murata | ................ | G02B 6/4202 |
| | | | | 385/52 |
| 2003/0025825 A1* | 2/2003 | Nakajoh | .......... | H01L 27/14618 |
| | | | | 348/374 |
| 2003/0098511 A1* | 5/2003 | Moon | ................. | G02B 6/4232 |
| | | | | 257/778 |
| 2008/0291552 A1* | 11/2008 | Nogami | ................ | G02B 7/182 |
| | | | | 359/736 |
| 2008/0305562 A1* | 12/2008 | Savoia | ..................... | G01J 1/02 |
| | | | | 438/7 |
| 2010/0165183 A1* | 7/2010 | Tian | ..................... | H04N 5/2254 |
| | | | | 348/374 |
| 2012/0173143 A1* | 7/2012 | Belenkii | ................ | G01C 21/02 |
| | | | | 701/513 |
| 2015/0116839 A1* | 4/2015 | Li | ......................... | G02B 27/30 |
| | | | | 359/641 |
| 2017/0052294 A1* | 2/2017 | Cangemi | ............... | G02B 7/025 |
| 2017/0242208 A1* | 8/2017 | Lee | ..................... | G02B 6/4204 |
| 2019/0041590 A1* | 2/2019 | Jung | ................... | G02B 6/4244 |

\* cited by examiner

OPTICAL MODULE PLATFORM STRUCTURE AND METHOD OF MANUFACTURING THE SAME

CROSS-REFERENCE TO RELATED APPLICATIONS

This application claims priority under 35 U.S.C. § 119 to Korean Patent Application No. 10-2017-0098758, filed on Aug. 4, 2017, and 10-2018-0012813, filed on Feb. 1, 2018, the disclosures of which are incorporated herein by reference in their entirety.

TECHNICAL FIELD

The present invention relates to an optical module platform structure and a method of manufacturing the same, in which a lens is mounted in optical alignment between a multichannel light source and a waveguide.

BACKGROUND

Recently, as industries such as a data center and artificial intelligence (AI) advance rapidly, it is required to transmit or receive more data for a short time, and thus, optical communication technology is attracting much attention. Therefore, miniaturizing and speeding up of an optical transceiver module which performs a core function in optical communication are needed.

An optical transceiver module for optical communication includes an optical sub assembly (OSA) unit for performing conversion (optical-to-electric conversion/electric-to-optical conversion) between an optical signal and an electrical signal and an electrical sub assembly (ESA) unit for performing signal processing on an electrical signal.

Here, the OSA unit includes a transmitter optical sub assembly (TOSA) which converts an electrical signal into an optical signal and transmits the optical signal and a receiver optical sub assembly (ROSA) which converts a received optical signal into an electrical signal.

In order to secure maximum optical coupling efficiency in manufacturing core elements such as the TOSA and the ROSA, precise optical alignment of optical devices such as a laser diode (LD), a photodiode (PD), a mirror, a lens, and a waveguide in an optical transceiver is needed.

In a single mode optical fiber, a diameter of an optical waveguide core is about 9 µm, and in order to secure maximum optical coupling efficiency, an optical alignment error of a lens is allowed within a range of several µm or less.

In recent trend, as miniaturizing and speeding up of optical modules are needed, the use of multichannel optical modules is increasing rapidly. Also, in order to decrease a size of each of the optical modules, a refractive index difference between a core and a cladding of a waveguide included in the TOSA/ROSA increases, and thus, a thickness of a core layer is reduced by about 3 µm.

Therefore, sensitivity to optical alignment has more increased, and due to this, cost and time are expended in an optical aligning and bonding process for a lens in packaging optical elements.

Figure 1:
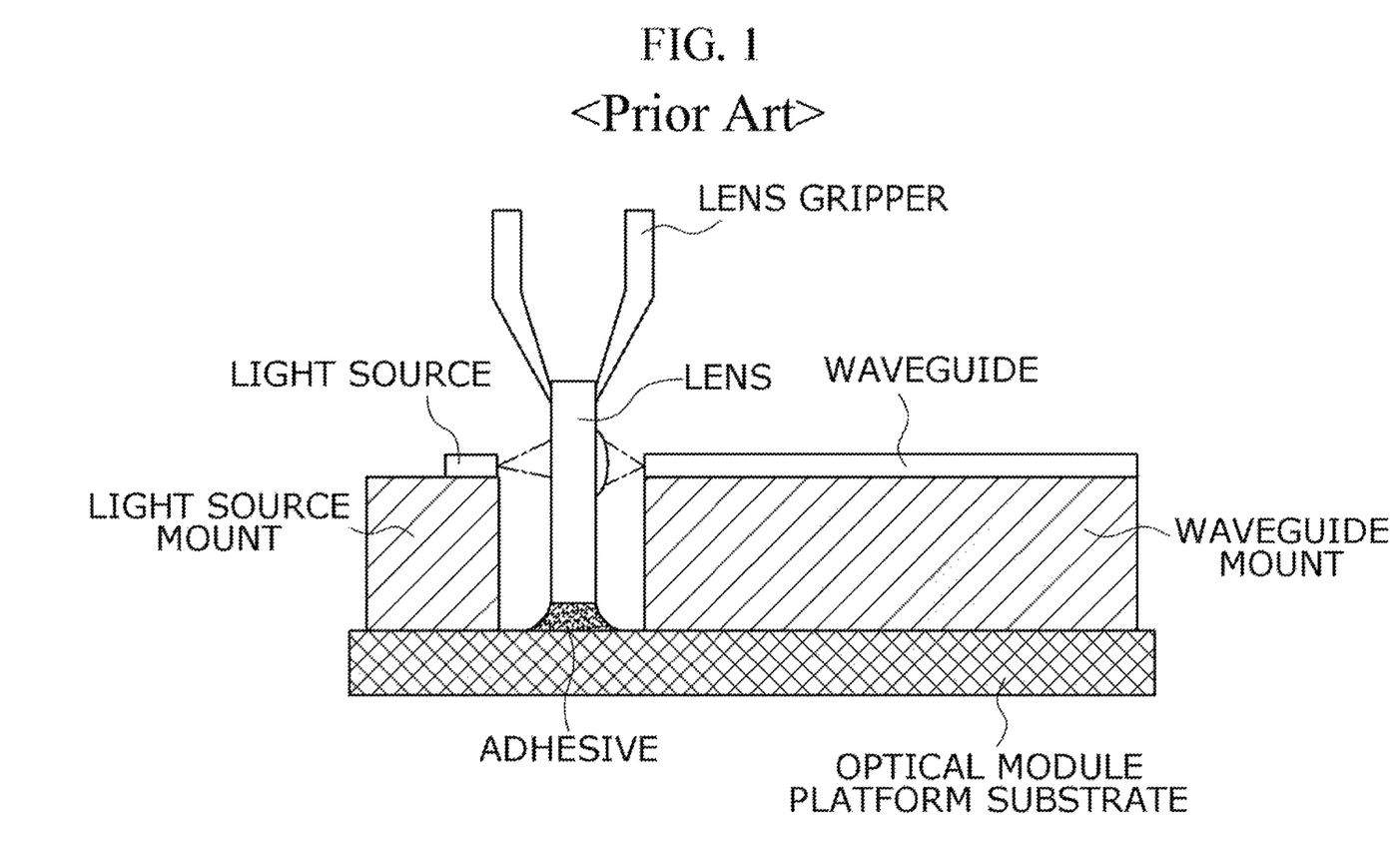
FIG. 1 is a side view illustrating optical alignment of an optical device in a related art optical element.

Generally, as illustrated in FIG. 1, the lens is inserted into a space between the waveguide and the LD for optical alignment of the LD and the waveguide, and then, the amount of light incident on the waveguide is maximized by adjusting a position to three X-Y-Z axes.

In this case, after the position is optimally adjusted by finely controlling the lens, epoxy is injected into a space between a lower end of the lens and an optical module platform substrate, and then, by hardening the epoxy with light having a thermal or ultraviolet (UV) wavelength range, the lens is fixed.

A process of hardening the epoxy used to fix the lens has a feature where the epoxy is changed from an initial liquid state to a gel state corresponding to a semisolid state by using heat or light having the UV wavelength range, and then, is hardened to a solid state.

At this time, a hardener included in the epoxy evaporates while the liquid state is being changed to the solid state, and thus, a contraction process where volume of the epoxy is reduced is accompanied.

In relate art, in a lens assembly process using epoxy, a contracting force based on epoxy contraction is generated between a lens and a platform substrate, and the contracting force acts as a force for changing a position of the lens.

In a general lens assembly process, a holder such as a lens gripper strongly grips a lens, for maintaining a position of the lens as an initial maximum optical alignment point against the contracting force.

Figure 2:
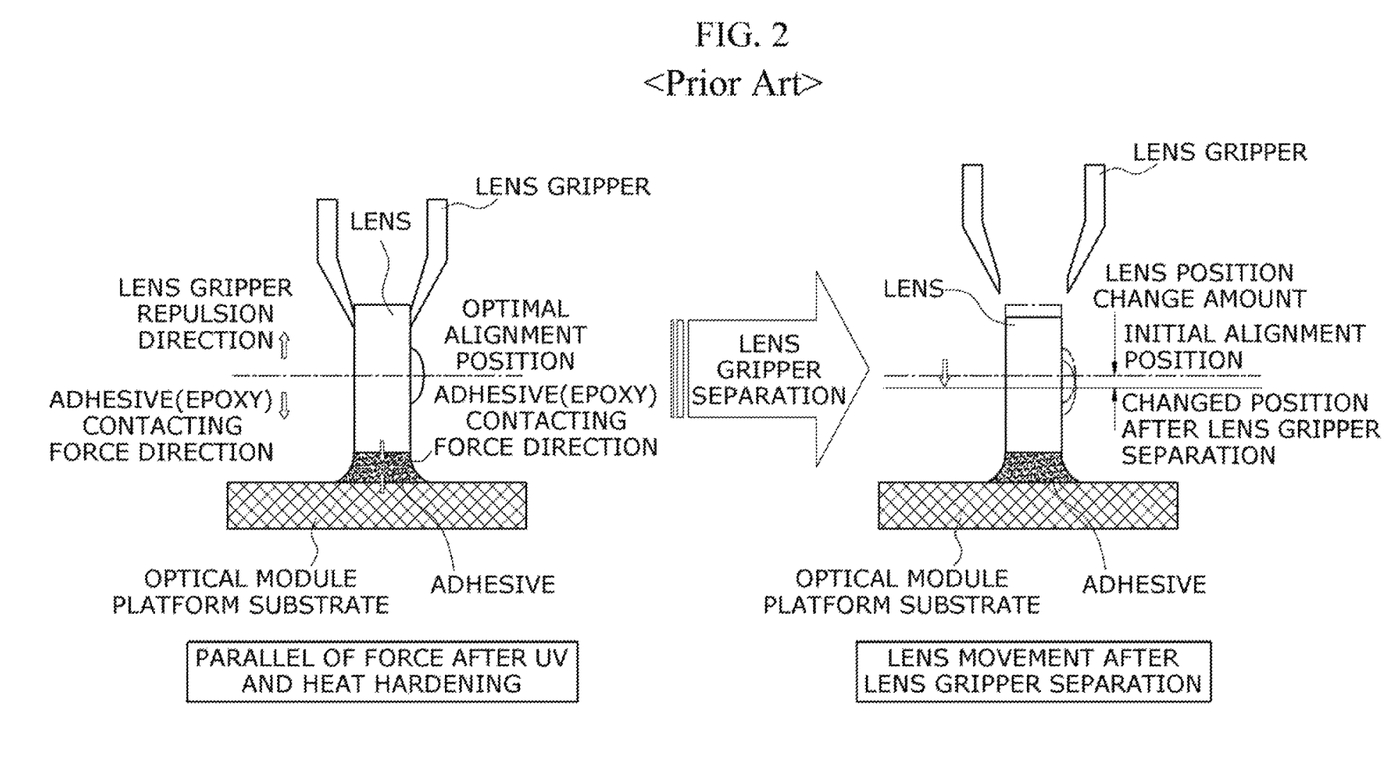
FIG. 2 is a diagram illustrating a contracting force in a general epoxy hardening process and reaction acting on a lens gripper.

However, as illustrated in FIG. 2, after an epoxy hardening process ends, the position of the lens is maintained by force balance between an epoxy contracting force and a gripping force based on the lens gripper. Finally, when the lens is separated from the lens gripper, a lens gripping force is removed, and due to this, force balance is disrupted, whereby a position of the lens is moved in an epoxy contracting direction from an initial alignment position by a force acting in the epoxy contracting direction. For this reason, optical coupling loss occurs due to changing the position of the lens.

In order to solve such a problem, recently, a hardening time increases by reducing energy of UV for hardening epoxy or reducing a hardening temperature, and thus, a time of a process of changing a gel state to a solid state increases in the epoxy hardening process. The gel state where a contracting force is relatively small and there is flowability is maintained for a relatively long time, and a lens position error is gradually, finely, and continuously corrected in a hardening process until the gel state is changed to the solid state. As described above, a method for minimizing the optical alignment error is applied.

However, in such a method, since an epoxy hardening time is long, a product producing speed is reduced, and the price of products increases.

Therefore, it is required to shorten an epoxy hardening time, for securing productivity of products and price competitiveness.

SUMMARY

Accordingly, the present invention provides an optical module platform structure and a method of manufacturing the same, in which optical coupling efficiency between a light source and a waveguide is maximized by applying a lens mount, and an epoxy hardening time taken in fixing a lens is minimized.

In one general aspect, an optical module platform structure includes: an optical module platform substrate; a light source device mounted on a light source mount attached on one upper side of the optical module platform substrate; a waveguide spaced apart from the light source device by a certain interval and mounted on a waveguide mount attached on the optical module platform substrate; a lens mount fixed between the light source mount and the waveguide mount; and a lens fixed to a top of the lens mount.

A first lens mount guide may be mounted between the light source mount and the lens mount, and a second lens mount guide may be mounted between the waveguide mount and the lens mount.

The first lens mount guide and the second lens mount guide may be mounted and spaced apart from the optical module platform substrate by an interval.

The optical module platform substrate may include a through hole provided in a portion corresponding to the lens mount.

The optical module platform substrate may include a through hole provided in a portion corresponding to the first lens mount guide.

The optical module platform substrate may include a through hole provided in a portion corresponding to the second lens mount guide.

The lens mount may be provided wider in width than the first lens mount guide or the second lens mount guide.

A height of the lens mount may be set lower than a height of the first lens mount guide or the second lens mount guide.

The light source mount and the first lens mount guide may be fixed by a first adhesive part, the waveguide mount and the second lens mount guide may be fixed by a second adhesive part, the first lens mount guide and the lens mount may be fixed by a fourth adhesive part, and the second lens mount guide and the lens mount may be fixed by a fifth adhesive part.

Each of the first, second, fourth, and fifth adhesive parts may be formed of an epoxy resin.

The light source device and the waveguide may be disposed on an optical path.

In another general aspect, a method of manufacturing an optical module platform structure includes: a light source device attaching process of a light source mount, on which a light source device is mounted, on one upper side of an optical module platform substrate; a lens mount attaching process of closely attaching a lens mount on a side surface of the light source mount; a waveguide attaching process of closely attaching a waveguide mount, on which a waveguide is mounted, on an opposite side surface of the lens mount and attaching the waveguide mount on the optical module platform substrate; a lens fixing process of disposing a lens on the lens mount and coating an adhesive to form a third adhesive part; and a lens mount fixing process of, when the lens mount is raised in a Y-axis direction by a contraction of the adhesive in hardening the third adhesive part, coating an adhesive on the lens mount, the first lens mount guide, and the second lens mount guide to form a fourth adhesive part and a fifth adhesive part.

The method may further include, between the light source device attaching process and the lens mount attaching process, a first lens mount guide installing process of mounting the first lens mount guide between the light source mount and the lens mount and coating an adhesive on a space between the light source mount and the first lens mount guide to form a first adhesive part.

The method may further include, between the lens mount attaching process and the waveguide attaching process, a second lens mount guide installing process of mounting the second lens mount guide between the lens mount and the waveguide mount and coating an adhesive on a space between the second lens mount guide and the waveguide mount to form a second adhesive part.

The method may further include, after the lens fixing process, a lens mount fixing process of raising the lens mount to a portion on each of the first and second lens mount guides and coating an adhesive on a space between the lens mount and the first and second lens mount guides to form a fourth adhesive part and a fifth adhesive part.

A through hole may be provided in the optical module platform substrate corresponding to the lens mount.

A through hole may be provided in the optical module platform substrate corresponding to the first and second lens mount guides.

The lens mount may be disposed lower in height than the first lens mount guide or the second lens mount guide.

In the lens fixing process, the lens may be inserted between the light source device and the waveguide by using a lens gripper and may be mounted at a point at which a light output of the waveguide is the maximum.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 3:
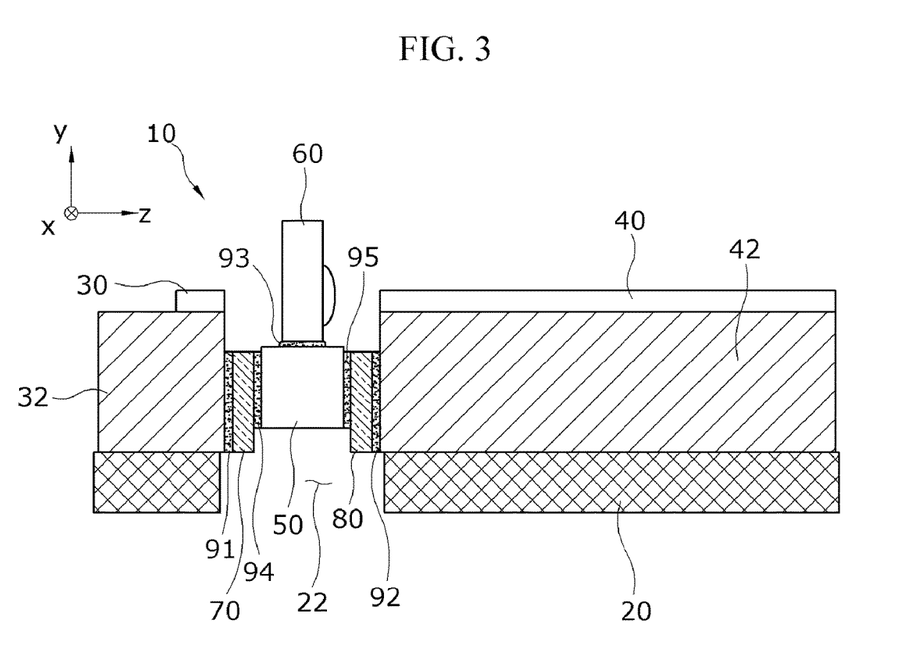
FIG. 3 is a side view illustrating an optical module platform structure according to an embodiment of the present invention.

Hereinafter, embodiments of the present invention will be described in detail with reference to the accompanying drawings. FIG. 3 is a side view illustrating an optical module platform structure 10 according to an embodiment of the present invention.

Referring to FIG. 3, the optical module platform structure 10 according to an embodiment of the present invention may include an optical module platform substrate 20, a light source device 30, a waveguide 40, a lens mount 50, a lens 60, a first lens mount guide 70, and a second lens mount guide 80.

The optical module platform substrate 20 may be variously implemented based on an environment and purposes. In the present embodiment, the optical module platform substrate 20 may be implemented as a board type having a certain size.

Moreover, the optical module platform substrate 20 may include a through hole which is provided in a portion corresponding to the lens mount 50, the first lens mount guide 70, and the second lens mount guide 80.

Here, the through hole 22 provided in the optical module platform substrate 20 may prevent the lens mount 50, the first lens mount guide 70, and the second lens mount guide 80 from being attached on the optical module platform substrate 20, and depending on the case, the through hole 22 may enable the lens mount 50 to move to a lens position having maximum optical coupling efficiency.

The light source device 30 may be mounted on a light source mount 32 which is provided on one upper side of the optical module platform substrate 20.

That is, the light source device 30 may be mounted on the light source mount 32 provided on the optical module platform substrate 20, and when power is supplied, the light source device 30 may irradiate light in a direction toward the lens 60.

The waveguide 40 may be mounted on a waveguide mount 42 provided on one upper side of the optical module platform substrate 20.

That is, the waveguide 40 may be spaced apart from the light source device 30 by a certain interval and may be mounted on the waveguide mount 42 provided on the optical module platform substrate 20 to block light transferred via the lens 60.

The lens mount 50 may be fixed between the light source mount 32 and the waveguide mount 42.

Here, the lens mount 50 may be implemented in various shapes, based on an environment and purposes. In the present embodiment, the lens mount 50 may be implemented in a tetragonal or rectangular shape for minimizing a position change of the lens 60 caused by an adhesive part.

Moreover, the first lens mount guide 70 may be mounted between the lens mount 50 and the light source mount 32, and the second lens mount guide 80 may be mounted between the lens mount 50 and the waveguide mount 42.

That is, after the lens mount 50 is disposed between the light source mount 32 and the waveguide mount 42, the first lens mount guide 70 may be fixed between the lens mount 50 and the light source mount 32, and the second lens mount guide 80 may be fixed between the lens mount 50 and the waveguide mount 42.

In this case, the light source mount 32 and the first lens mount guide 70 may be fixed by a first adhesive part 91, the waveguide mount 42 and the second lens mount guide 80 may be fixed by a second adhesive part 92, the first lens mount guide 70 and the lens mount 50 may be fixed by a fourth adhesive part 94, and the second lens mount guide 80 and the lens mount 50 may be fixed by a fifth adhesive part 95.

Here, the first, second, fourth, and fifth adhesive parts 91, 92, 94, and 95 may each be formed of one of adhesives well known to those skilled in the art. In the present embodiment, the first, second, fourth, and fifth adhesive parts 91, 92, 94, and 95 may each be formed of an epoxy resin.

The lens 60 may be fixed to a top of the lens mount 50.

Moreover, the lens 60 may be fixed by a third adhesive part 93 provided between the lens 60 and the lens mount 50. Here, the third adhesive part 93 may be formed of one of adhesives well known to those skilled in the art. In the present embodiment, the third adhesive part 93 may be formed of an epoxy resin.

That is, the lens 60 may be fixed to and mounted on the top of the lens mount 50 by the third adhesive part 93 and may allow light, emitted from the light source device 30, to concentrate on the waveguide 40.

Figure 4:
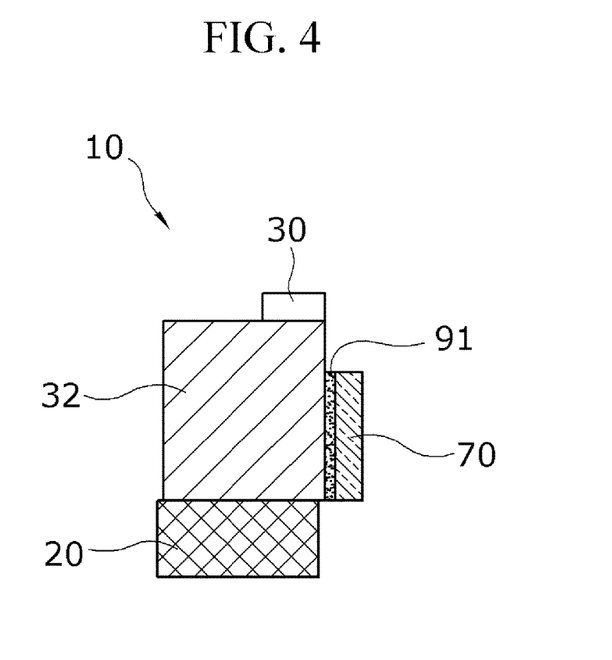
FIG. 4 is a diagram illustrating a process of installing a first lens mount guide in a method of manufacturing an optical module platform structure according to an embodiment of the present invention.
Figure 5:
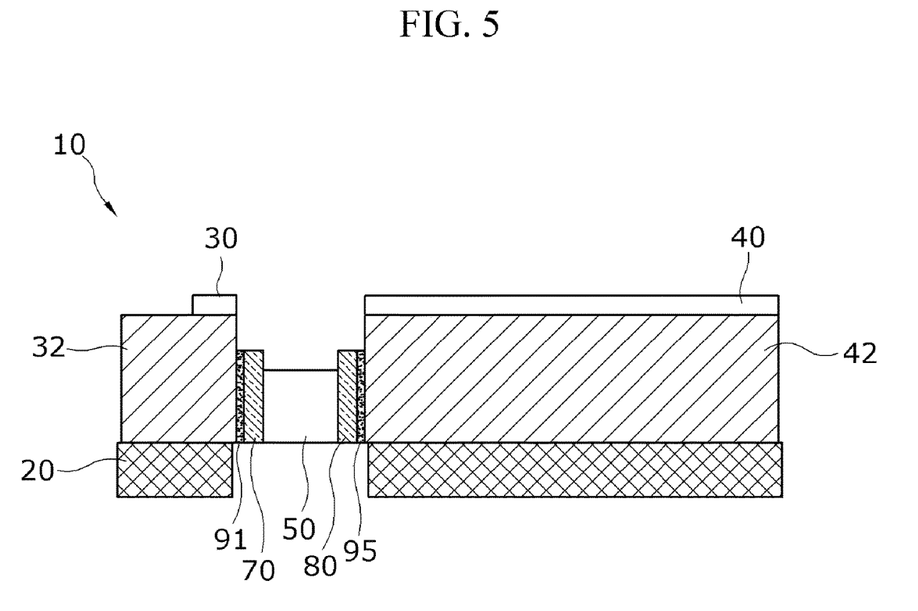
FIG. 5 is a diagram illustrating a process of installing a second lens mount guide in a method of manufacturing an optical module platform structure according to an embodiment of the present invention.
Figure 6:
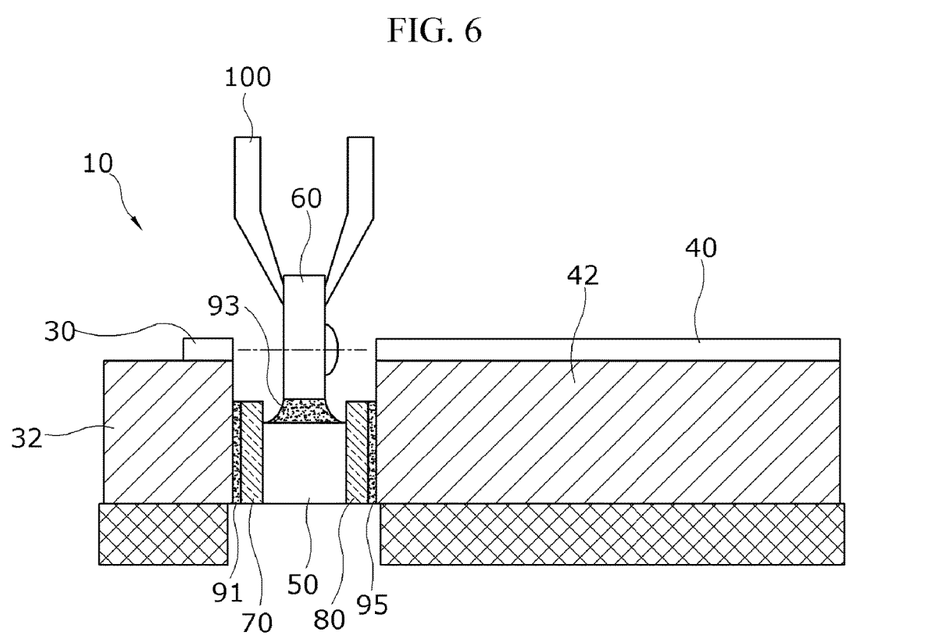
FIG. 6 is a diagram illustrating an alignment state of a lens for maximum optical coupling efficiency in a method of manufacturing an optical module platform structure according to an embodiment of the present invention.
Figure 7:
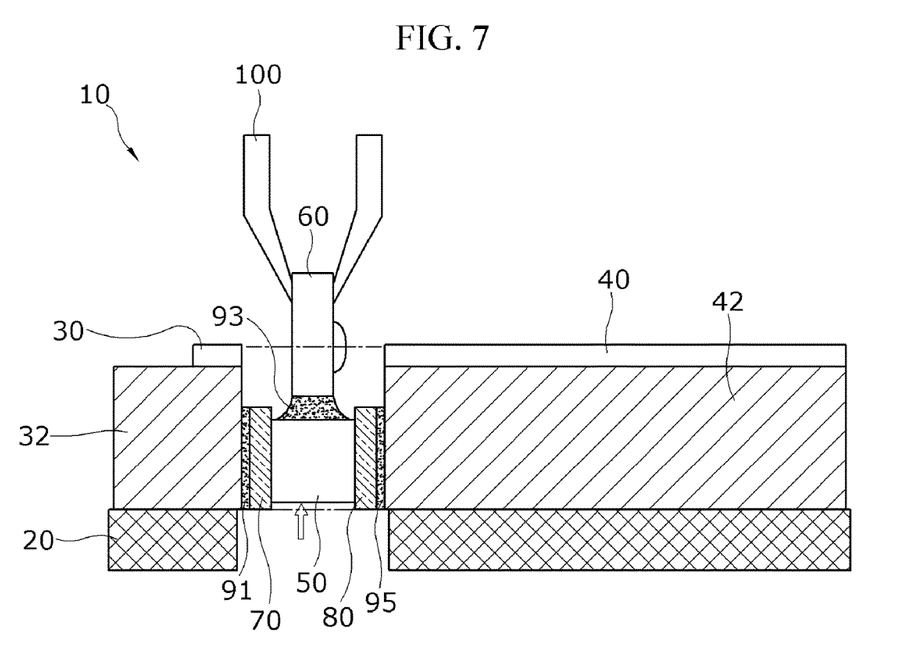
FIG. 7 is a diagram illustrating an example where a lens mount is moved in a Y-axis direction by contraction of an adhesive, in a method of manufacturing an optical module platform structure according to an embodiment of the present invention.
Figure 8:
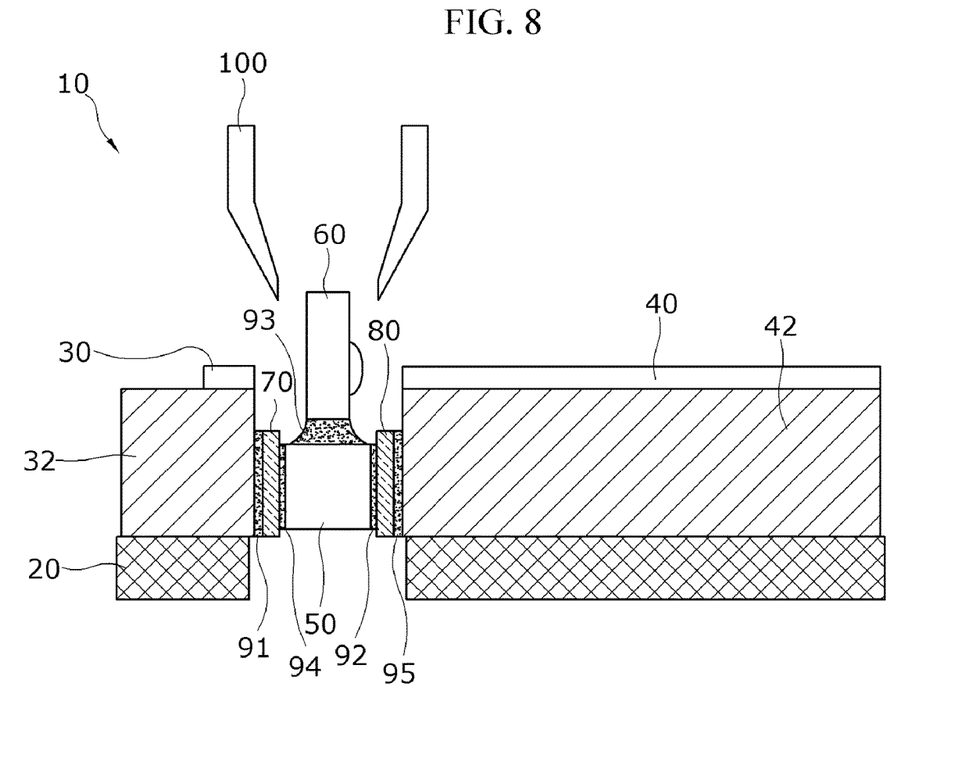
FIG. 8 is a diagram illustrating a lens mount attaching process in a method of manufacturing an optical module platform structure according to an embodiment of the present invention.

Hereinafter, a method of manufacturing an optical module platform structure according to an embodiment of the present invention will be described with reference to the accompanying drawings. FIG. 4 is a diagram illustrating a process of installing a first lens mount guide in a method of manufacturing an optical module platform structure according to an embodiment of the present invention. FIG. 5 is a diagram illustrating a process of installing a second lens mount guide in a method of manufacturing an optical module platform structure according to an embodiment of the present invention. FIG. 6 is a diagram illustrating an alignment state of a lens for maximum optical coupling efficiency in a method of manufacturing an optical module platform structure according to an embodiment of the present invention. FIG. 7 is a diagram illustrating an example where a lens mount is moved in a Y-axis direction by contraction of an adhesive, in a method of manufacturing an optical module platform structure according to an embodiment of the present invention. FIG. 8 is a diagram illustrating a lens mount attaching process in a method of manufacturing an optical module platform structure according to an embodiment of the present invention.

First, as illustrated in FIG. 4, the light source mount 32 with the light source device 30 attached thereon may be attached on the optical module platform substrate 20, and then, by using an adhesive such as epoxy, the first adhesive part 91 may be provided on a side surface of the light source mount 32. Subsequently, the first lens mount guide 70 may be attached.

Subsequently, as illustrated in FIG. 5, the lens mount 50 may be closely adhered to a side surface of the first lens mount guide 70, and then, the second lens mount guide 80 may be closely adhered to an opposite side surface of the lens mount 50.

Subsequently, the waveguide mount 42 with the waveguide 40 mounted thereon may be closely adhered to a side surface of the second lens mount guide 80, and then, the second adhesive part 92 may be formed of an adhesive such as epoxy between the second lens mount guide 80 and the waveguide mount 42 with the waveguide 40 mounted thereon. Subsequently, a lower end surface of the waveguide mount 42 may be attached on the optical module platform substrate 20.

In this case, the light source mount 32, the first and second lens mount guides 70 and 80, the lens mount 50, and the waveguide mount 42 may be adhered to one another as much as possible so that a clearance is not formed between left and right side surfaces adhered to each other.

That is, the light source mount 32, the first lens mount guide 70, the waveguide mount 42, and the second lens mount guide 80 may be position-fixed to the optical module platform substrate 20. Also, the lens mount 50 may have a degree of freedom in an X-axis direction and a Y-axis direction illustrated in FIG. 3, but a degree of freedom of the lens mount 50 may be limited in a Z-axis direction so as not to move.

Subsequently, as illustrated in FIG. 6, the lens 60 may be inserted between the light source device 30 and the waveguide 40 by using a lens gripper 100, and the lens 60 may move in each of the X, Y, and Z-axis directions in order for a light output of the waveguide 40 to be the maximum, thereby selecting a point which enables the lens 60 to achieve maximum optical coupling efficiency.

Subsequently, the third adhesive part 93 may be formed of an adhesive such as epoxy between a lower end surface of the lens 60 and an upper end of the lens mount 50 in order for the lens 60 to be fixed to an optimal optical alignment point.

At this time, in a process of forming the third adhesive part 93, the lens mount 50 may move in a Y-axis upward direction and may be closely adhered to the lower end surface of the lens 60 depending on the case.

Subsequently, if the third adhesive part 93 is hardened, although the lens mount 50 moves in the Y-axis upward direction based on a degree of freedom of the lens mount 50 in the Y-axis direction and is hardened, repulsion does not occur in a contracting direction, and thus, the lens 60 disposed on the lens mount 50 may maintain an optimal optical alignment position.

To additionally provide a more detailed description, since the third adhesive part 93 is formed by hardening an adhesive such as epoxy, a hardener may evaporate in a hardening process, and thus, volume is reduced, whereby a contracting force is generated.

That is, as illustrated in FIG. 1, in a case where the lens is fixed to a floor of the optical module platform substrate by using an adhesive such as epoxy, a contracting force in a Y-axis downward direction is generated, and due to this, the lens gripper which should maintain the optimal optical alignment point of the lens should apply repulsion in the Y-axis upward direction.

The repulsion may be removed in a process of separating the lens from the lens gripper after an adhesive such as epoxy is hardened, and only a contracting force of the adhesive such as epoxy acting in the Y-axis downward direction of the lens may remain. As a result, the lens attached on the lens mount may move in the Y-axis downward direction, and moreover, an optical alignment error occurs.

However, the third adhesive part 93 according to an embodiment of the present invention may be contracted in the hardening process to move the lens mount 50 in the Y-axis upward direction, thereby solving the above-described problem.

At this time, the through hole 22 may be formed in a certain region of the optical module platform substrate 20 under the lens mount 50 so that a contracting force of the lens mount 50 caused by the adhesive such as epoxy does not occur, and depending on the case, the through hole 22 may be used to move the lens mount 50 to a position of the lens having maximum optical coupling efficiency.

Subsequently, the third adhesive part 93 is completely hardened in order for contraction deformation not to occur, and as illustrated in FIG. 8, the fourth and fifth adhesive parts 94 and 95 may be formed on a side surface between the lens mount 50 and the first and second lens mount guides 70 and 80 by hardening an adhesive such as epoxy.

Subsequently, when the lens gripper 100 is separated from the lens 60, optical alignment performed by the lens 60 between the light source device 30 and the waveguide 40 may be completed.

As described above, a main cause of contraction in the Y-axis direction which occurs in a hardening process of hardening an adhesive such as epoxy may be a contraction of the adhesive of the third adhesive part between the lens and the lens mount, and a main cause of contraction in the Z-axis direction may be a contraction of the adhesive of each of the fourth and fifth adhesive parts.

However, a contraction of the adhesive of the third adhesive part occurring in the Y-axis direction does not cause repulsion in the lens gripper because the lens mount has a degree of freedom in a hardening process, and thus, even when the lens gripper is removed after the hardening process ends, a position of the lens is not changed.

Moreover, contractions of the adhesives of the fourth and fifth adhesive parts occurring in the Z-axis direction may be laterally symmetrical with respect to the lens mount, and thus, contracting forces caused by the contractions of the adhesives may be parallel to each other in the Z-axis direction.

Furthermore, since elements such as the light source mount, the lens mount, the first and second lens mount guides, and the waveguide gripper are closely adhered to one another so that there is no clearance, a thickness of each of the adhesive parts is thinned, and thus, a contracting force caused by a contraction of an adhesive is very weak.

Generally, in optical alignment between a waveguide and a light source using a lens as in the present invention, a Z-axis optical tolerance is relatively five or more times greater than an X axis and a Y axis.

Figure 9:
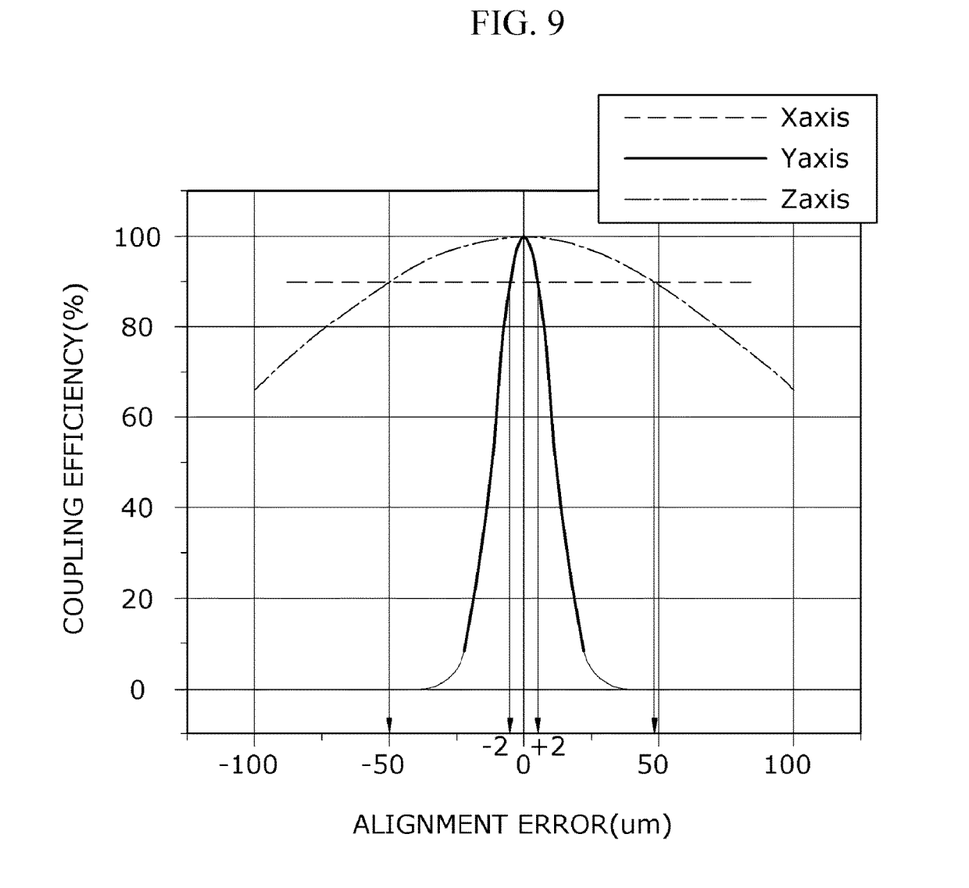
FIG. 9 is a graph showing optical coupling efficiency with respect to X, Y, and Z axis displacement in a method of manufacturing an optical module platform structure according to an embodiment of the present invention.

For example, as shown in FIG. 9, in optical alignment between optical fiber light sources, an X-axis optical tolerance and a Y-axis optical tolerance need a degree of precision of several μm or less so as to achieve an efficiency of 90% or more. On the other hand, a Z-axis optical tolerance needs a degree of precision of about tens μm and is relatively very greater than the X axis and the Y axis.

Therefore, considering such conditions, the occurrence of an optical alignment position error caused by a contraction of an adhesive on the Z axis is very weak.

As a result, in the present invention, a structure where internal elements are disposed and a manufacturing process are proposed so that the occurrence of an optical alignment position error is minimized, in consideration of a contracting direction of an adhesive, and thus, an effect where an optical alignment error is minimized is obtained despite increasing a hardening speed of an adhesive in comparison with the relate art.

In the optical module platform structure and a method of manufacturing the same according to the embodiments of the present invention, optical coupling efficiency between a light source and a waveguide is maximized by applying a lens mount, and internal configuration is provided for minimizing the occurrence of an optical alignment position error and a contracting direction of an adhesive. Also, in comparison with the related art, a hardening speed of the adhesive increases, and an error of optical alignment is minimized.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical module platform structure comprising:
   an optical module platform substrate including a through hole;
   a light source device mounted on a light source mount, the light source mount being attached on an upper side of the optical module platform substrate;
   a waveguide spaced apart from the light source device by a given distance and mounted on a waveguide mount, the waveguide mount being attached on the optical module platform substrate;
   a lens mount fixed between the light source mount and the waveguide mount;
   a lens fixed to a top surface of the lens mount by an adhesive part that is coated on the top surface of the lens mount;
   a first lens mount guide disposed between the light source mount and the lens mount; and
   a second lens mount guide is disposed between the waveguide mount and the lens mount,
   wherein the through hole has a width that is greater than a sum of a width of the first lens mount guide, a width of the lens mount, and a width of the second lens mount guide.

2. The optical module platform structure of claim 1, wherein the first lens mount guide and the second lens mount guide are mounted and spaced apart from the optical module platform substrate by a given interval.

3. The optical module platform structure of claim 2, wherein the through hole of the optical module platform substrate is provided in a portion corresponding to the lens mount, the first lens mount guide, and the second lens mount guide, the lens mount, the first lens mount guide, and the second lens mount guide being entirely exposed by the through hole when seen in a bottom view.

4. The optical module platform structure of claim 2, wherein the lens mount is provided wider in width than the first lens mount guide or the second lens mount guide.

5. The optical module platform structure of claim 2, wherein a height of the lens mount is set lower than a height of the first lens mount guide or the second lens mount guide.

6. The optical module platform structure of claim 1, wherein the adhesive part is a third adhesive part, the light source mount and the first lens mount guide are fixed by a first adhesive part, the waveguide mount and the second lens mount guide are fixed by a second adhesive part, the first lens mount guide and the lens mount are fixed by a fourth adhesive part, and the second lens mount guide and the lens mount are fixed by a fifth adhesive part.

7. The optical module platform structure of claim 6, wherein each of the first, second, fourth, and fifth adhesive parts is formed of an epoxy resin.

8. The optical module platform structure of claim 1, wherein the light source device and the waveguide are disposed on an optical path.

9. A method of manufacturing an optical module platform structure, the method comprising:
   a light source device attaching process of a light source mount, on which a light source device is mounted, on an upper side of an optical module platform substrate;
   a lens mount attaching process of closely attaching a first side surface of a lens mount to a first lens mount guide that is disposed on a side surface of the light source mount;
   a waveguide attaching process of closely attaching a waveguide mount, on which a waveguide is mounted, on a second side surface of the lens mount that is opposite to the first side surface, and attaching the waveguide mount on the optical module platform substrate;
   a lens fixing process of coating an adhesive to form a third adhesive part on a top surface of the lens mount and mounting a lens on the top surface of the lens mount; and
   a lens mount fixing process of moving the lens mount in a direction perpendicular to the upper side of the optical module platform substrate by contraction of the adhesive in hardening the third adhesive part.

10. The method of claim 9, further comprising, between the light source device attaching process and the lens mount attaching process, a first lens mount guide installing process of mounting the first lens mount guide between the light source mount and the lens mount and coating an adhesive on a space between the light source mount and the first lens mount guide to form a first adhesive part.

11. The method of claim 9, further comprising, between the lens mount attaching process and the waveguide attaching process, a second lens mount guide installing process of mounting the second lens mount guide between the lens mount and the waveguide mount and coating an adhesive on a space between the second lens mount guide and the waveguide mount to form a second adhesive part.

12. The method of claim 9, wherein a through hole is provided in the optical module platform substrate corresponding to the lens mount.

13. The method of claim 9, wherein a through hole is provided in the optical module platform substrate corresponding to the first and second lens mount guides.

14. The method of claim 9, wherein the lens mount is disposed lower in height than the first lens mount guide or the second lens mount guide.

15. The method of claim 9, wherein, in the lens fixing process, the lens is inserted between the light source device and the waveguide by using a lens gripper and is mounted at a point at which a light output of the waveguide is the maximum.

16. The method of claim 9, wherein the lens mount fixing process further comprises forming a forth adhesive part between the first side surface of the lens mount and a side surface of the first lens mount guide and forming a fifth adhesive part between the second surface of the lens mount and a side surface of the second lens mount guide.

17. The method of claim 9, wherein a through hole is provided in the optical module platform substrate, the through hole having a width that is greater than a sum of a width of the first lens mount guide, a width of the lens mount, and a width of the second lens mount guide.

18. The method of claim 17, wherein the through hole of the optical module platform substrate is provided in a portion corresponding to the lens mount, the first lens mount guide, and the second lens mount guide, the lens mount, the first lens mount guide, and the second lens mount guide being entirely exposed by the through hole when seen in a bottom view.

19. The method of claim 18, further comprising moving the lens mount to a position in which the lens has maximum optical coupling efficiency using the through hole.

20. The method of claim 9, wherein the lens mount is moved away from the upper side of optical module platform substrate in the direction perpendicular to the upper side of the optical module platform substrate.

\* \* \* \* \*